(12) United States Patent
Pires et al.

(10) Patent No.: US 6,806,642 B2
(45) Date of Patent: Oct. 19, 2004

(54) LIGHT SOURCE WITH CASCADING DYES AND BEF

(75) Inventors: David G. Pires, Phoenix, AZ (US); Charles I. Zovko, Chandler, AZ (US)

(73) Assignee: Durel Corporation, Chandler, AZ (US)

( * ) Notice: Subject to any disclaimer, the term of this patent is extended or adjusted under 35 U.S.C. 154(b) by 123 days.

(21) Appl. No.: 09/947,085

(22) Filed: Sep. 4, 2001

(65) Prior Publication Data

US 2003/0042845 A1 Mar. 6, 2003

(51) Int. Cl.$^7$ .............................. H05B 33/02; H01J 1/62
(52) U.S. Cl. ...................... 313/506; 313/502; 313/503; 313/504; 313/507; 313/509; 313/512
(58) Field of Search ................ 313/506, 507, 313/502–504, 509, 512, 112, 113

(56) References Cited

U.S. PATENT DOCUMENTS

| | | | |
|---|---|---|---|
| 3,050,655 A | 8/1962 | Goldberg et al. ........... 313/108 |
| 3,052,810 A | 9/1962 | Mash .......................... 313/108 |
| 3,248,588 A | 4/1966 | Blazek et al. ............... 313/108 |
| 4,035,686 A | 7/1977 | Fleming ...................... 313/503 |
| 4,143,297 A | 3/1979 | Fischer ....................... 313/502 |
| 5,294,870 A * | 3/1994 | Tang et al. .................. 313/504 |
| 5,479,328 A | 12/1995 | Lee et al. ................... 362/216 |
| 5,504,661 A | 4/1996 | Szpak .......................... 362/30 |
| 5,586,879 A | 12/1996 | Szpak .......................... 445/34 |
| 5,684,354 A | 11/1997 | Gleckman ................... 313/110 |
| 5,747,183 A * | 5/1998 | Shi et al. ..................... 313/503 |
| 5,813,752 A | 9/1998 | Singer et al. ............... 362/293 |
| 5,813,753 A | 9/1998 | Vriens et al. ............... 362/293 |
| 5,815,228 A | 9/1998 | Flynn .......................... 349/71 |
| 5,838,644 A | 11/1998 | Yoneda et al. .............. 368/232 |
| 5,847,783 A * | 12/1998 | Hiramoto et al. ........... 345/102 |
| 5,883,684 A * | 3/1999 | Millikan et al. ............. 349/65 |
| 5,887,964 A * | 3/1999 | Higuchi et al. .............. 349/65 |
| 5,966,393 A | 10/1999 | Hide et al. .................. 372/23 |
| 5,982,092 A * | 11/1999 | Chen .......................... 313/112 |
| 6,023,371 A | 2/2000 | Onitsuka et al. ........... 359/620 |
| 6,028,694 A | 2/2000 | Schmidt ..................... 359/264 |
| 6,151,169 A * | 11/2000 | Kim ............................ 349/61 |
| 6,225,740 B1 * | 5/2001 | Tucker et al. ............... 313/506 |
| 6,354,709 B1 * | 3/2002 | Campbell et al. ............ 362/31 |
| 6,386,721 B1 | 5/2002 | Hosseini et al. ............. 362/31 |
| 6,473,554 B1 | 10/2002 | Pelka et al. ................. 385/146 |
| 6,481,864 B2 | 11/2002 | Hosseini et al. ............. 362/31 |
| 6,506,506 B1 * | 1/2003 | Tomiuchi et al. ........... 428/690 |

OTHER PUBLICATIONS

Society for Information Display, Short Course S–3, *Fundamentals of Liquid–Crystal Displays;* Steemers, Hugo, Jun. 12, 1994; pp. 6, 7, and 37.

Data Sheet for Vikuiti Brightness Enhancement Film (BEF) II; 3M Company, © 2000.

* cited by examiner

*Primary Examiner*—Nimeshkumar D. Patel
*Assistant Examiner*—Sikha Roy
(74) *Attorney, Agent, or Firm*—Paul F. Wille

(57) ABSTRACT

A light source producing predominantly blue light is tuned to the transmission bands of color LCD subpixels for optimum light transmission and color separation. The spectral output of the light source has three peaks located in the same areas of the spectrum where LCD color filters transmit most of the light, thereby providing a balanced white. It has been discovered that brightness enhancing films aid in the color conversion by enhancing the cascaded peaks, in addition to increasing the brightness of the light source.

1 Claim, 5 Drawing Sheets

LIGHT SOURCE WITH CASCADING DYES AND BEF

BACKGROUND OF THE INVENTION

This invention relates to light sources for backlighting a display and, in particular, to a light source including cascading dyes and a brightness enhancing film (BEF).

Light sources for backlighting displays and other applications often require a relatively full color spectrum. Incandescent lamps have a broad emission spectrum but tend to be reddish, consume too much power, and generate too much heat for most applications. Electroluminescent (EL) lamps rely on the emission of light from phosphors, which generally have a limited spectrum with pronounced peaks. Phosphors emitting different colors can be mixed and cascading dye added, wherein the dye converts light from one phosphor into light of a longer wavelength. Most light emitting diodes produce a very narrow spectrum of light but come in a variety of colors and can be quite bright in small sizes, as desired in displays for hand-held devices.

An EL lamp is essentially a capacitor having a dielectric layer between two conductive electrodes, one of which is transparent. The dielectric layer includes a phosphor powder or there is a separate layer of phosphor powder adjacent the dielectric layer. The phosphor powder emits light in the presence of a strong electric field, using very little current. An EL lamp requires high voltage, alternating current but consumes very little power, even including the current drawn by an inverter for driving an EL lamp.

In many applications, e.g. automotive displays and portable devices such as wrist watches, radios, global positioning systems, and compact disk players, an EL lamp is used for backlighting a liquid crystal display (LCD); e.g., as disclosed in U.S. Pat. Nos. 4,580,877 (Washo) and 5,121,234 (Kucera). The combination is popular because of the uniformity of the back lighting from an EL lamp and the resolution and contrast of the LCD. For full color liquid crystal displays, there is a problem in that the colors available from an EL lamp may not match the LCD.

It is known in the art to that good color performance can be obtained by achieving saturated primary colors and a balanced white point (referring to points on a CIE [Commission Internationale de l'Eclairage] chromaticity diagram). A balanced white point refers to the fact that the eye can be fooled into seeing white from sources that are really not white. For luminous sources viewed directly, such as EL lamps, this is fine. A problem develops if one filters the light in some way, e.g. with a color image in a transparency overlying the EL lamp. The colors in the image look incorrect if a truly white light source is not available. On a CIE diagram, the available light sources must define an area that encloses some white. The saturation of the colors determines how large the area is that encloses white.

In Fundamentals of Liquid-Crystal Displays, Society for Information Display, Jun. 12, 1994, a system is disclosed using fluorescent lamps for backlighting and color filters to match the available light to the colors (nominally blue, green, and red) of the sub-pixels in a color liquid crystal display. Whether or not such a system is effective, it is too bulky for many applications, such as hand-held devices and anywhere that space is at a premium.

U.S. Pat. No. 5,479,328 (Lee et al.) discloses a back lit display using a serpentine fluorescent lamp, a special reflector, and a brightness enhancing film. The Lee et al. patent also discloses that EL backlighting is unsuitable for LCDs because of "short lifetime, a low luminous efficiency, and poor color generation. Typical powder EL backlights have a lifetime of only approximately 500 hours. Even newer high-cost powder EL backlights are limited to approximately 1000 hours of use. Moreover, the luminous efficacy of powder EL backlights is totally unacceptable at 0.1 lm/w. In addition, powder EL backlights are limited in color."

Brightness enhancing films are commercially available from 3M company and include a plurality of parallel, V-shaped grooves in a transparent film to refract and reflect light. "Crossed" films, i.e. films having groove at 90° to each other, can increase brightness by up to one hundred percent.

It has long been known in the art to "cascade" phosphors, i.e. to use the light emitted by one phosphor to stimulate another phosphor or other material to emit light at a longer wavelength; e.g. see U.S. Pat. No. 3,052,810 (Mash). It is also known to doubly cascade phosphors. U.S. Pat. No. 6,023,371 discloses an EL lamp that emits blue light coated with a layer containing fluorescent dye and fluorescent pigment. In one example, the pigment absorbs blue light and emits green light, while the dye absorbs green light and emits red light.

In view of the foregoing, it is therefore an object of the invention to provide a full spectrum light source from a primary light source having a maximum emission at a wavelength of 550 nm or less.

Another object of the invention is to provide an EL lamp including at least one cascading dye and a brightness enhancing film to produce a full color spectrum.

A further object of the invention is to match a blue or blue-green light source to the color requirements of a liquid crystal display.

Another object of the invention is to provide an improved display system including a liquid crystal back lit by an EL lamp color matched to the liquid crystal display.

A further object of the invention is to provide a full color spectrum from a blue or blue-green light source using at least one cascading dyes and a brightness enhancing film.

SUMMARY OF THE INVENTION

The foregoing objects are achieved in this invention wherein a light source producing predominantly blue light is tuned to the transmission bands of color LCD subpixels for optimum light transmission and color separation. The spectral output of the light source has three peaks located in the same areas of the spectrum where LCD color filters transmit most of the light, thereby providing a balanced white. It has been discovered that brightness enhancing films aid in the color conversion by enhancing all colors but particularly red, in addition to increasing the apparent brightness of the light source.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
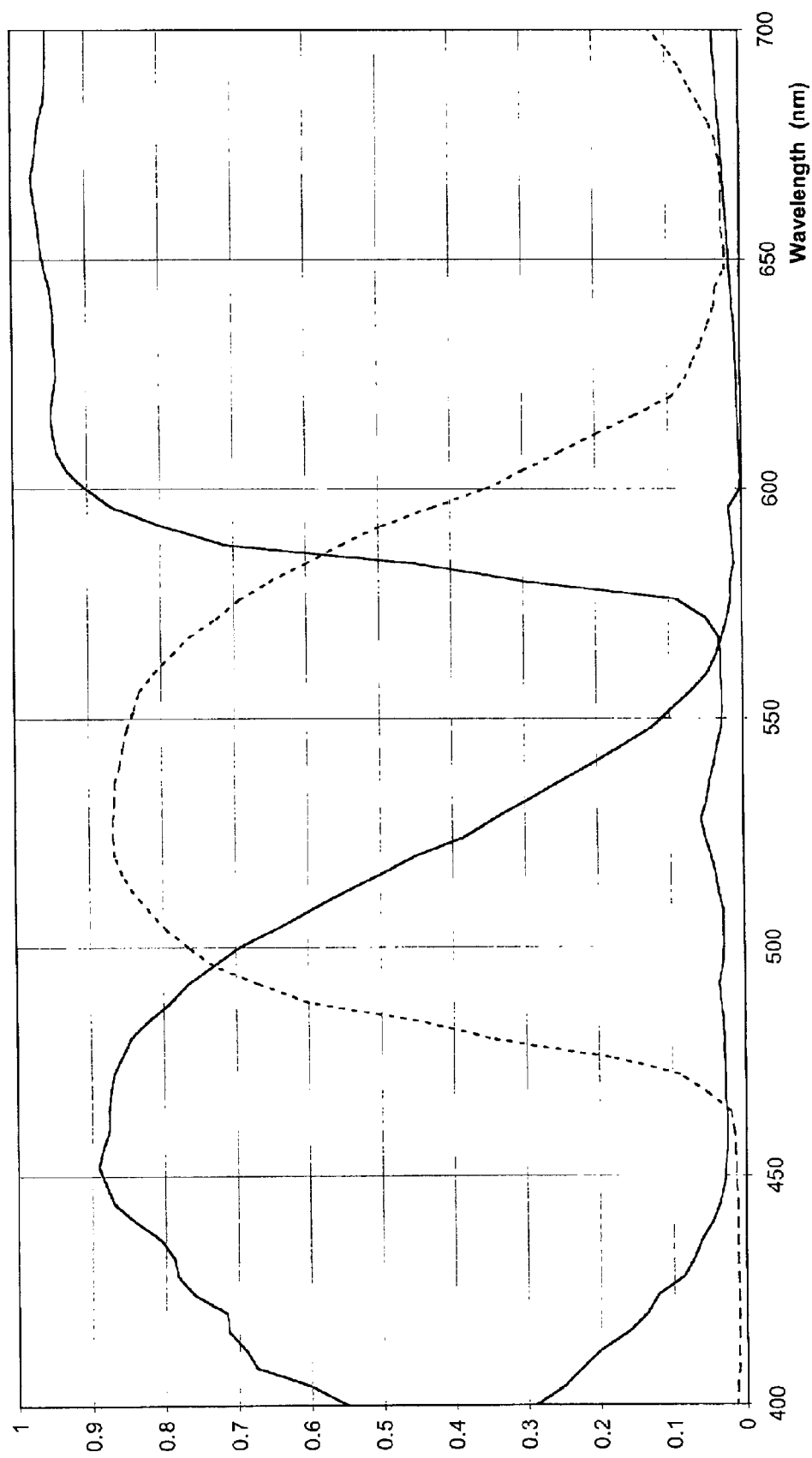
FIG. 1 is a chart of the transmission characteristics of filters in a color LCD.

FIG. 1 is a chart of the transmission characteristics of the three filters used in a color liquid crystal display. The blue filter peaks at approximately 460 nanometers (nm), the green filter peaks at approximately 530 nm, and the red filter has no peak but achieves maximum transmission at approximately 620 nm, which continues into the infra-red. Matching these filters not only would provide a brighter display but would provide good color rendition because one can provide saturated primary colors and a balance white point.

Figure 2:
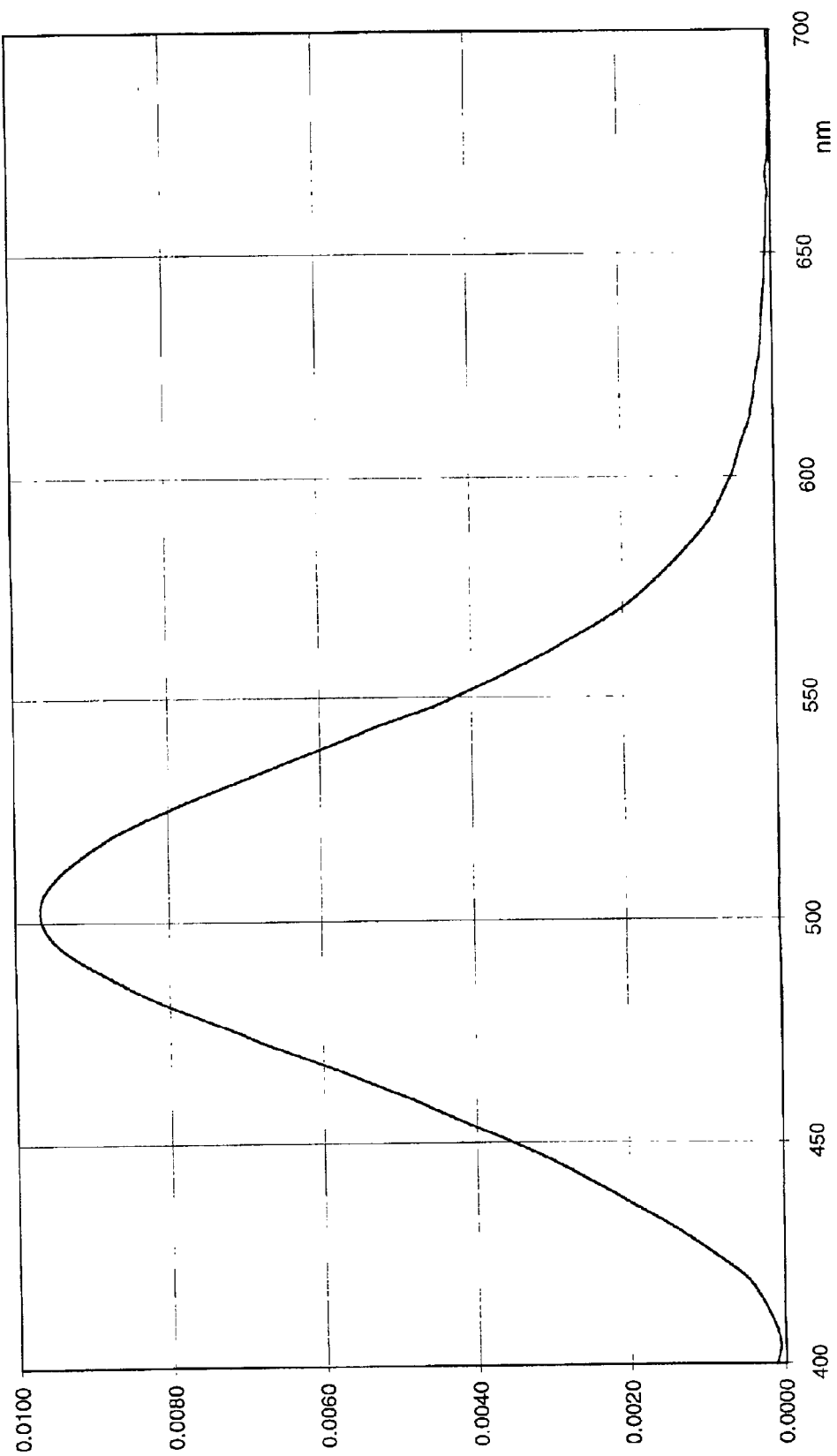
FIG. 2 is a chart of the emission spectrum of an EL lamp.

FIG. 2 is a chart of the emission spectrum of a blue-green EL lamp constructed in accordance with the prior art. The emission peaks at approximately 500 nm and contains very little red. Either a blue lamp or a blue-green lamp can be used for implementing the invention. In accordance with the invention, the lamp is overprinted with a layer of cascading dye, preferably Pyrromethene 567, to absorb some energy from the blue-green area of the spectrum and emit light in the green area of the spectrum. In particular, Pyrromethene 567 has an absorption peak at 517 nm and emits light with a peak at 546 nm. Other dyes can be used instead and the peak absorption and peak emission of many dyes is known in the art.

Figure 3:
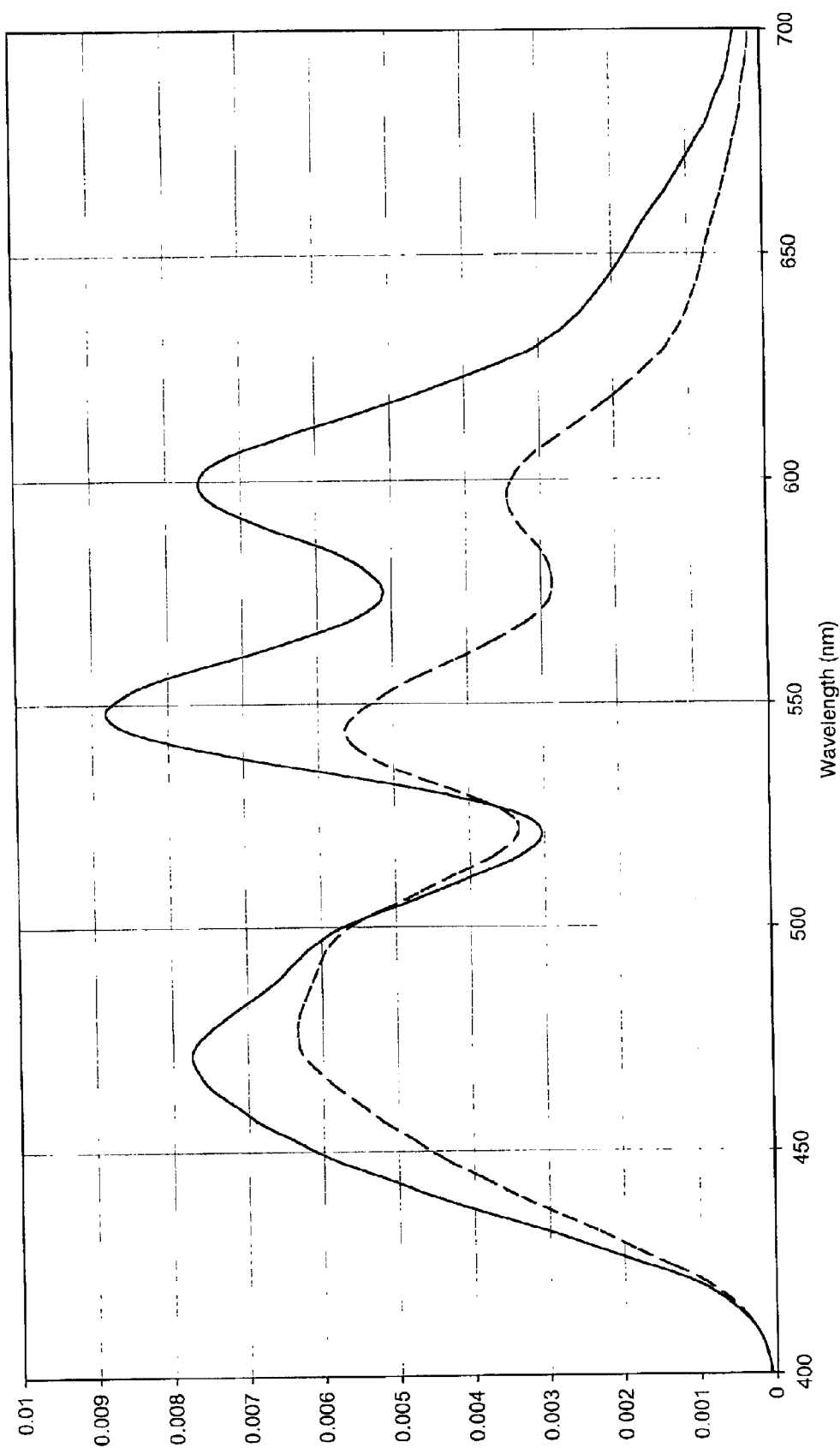
FIG. 3 is a chart of the emission spectra of an EL lamp without and with a brightness enhancing film.

In accordance with the invention, a second cascading dye is printed over the first layer, preferably sulforhodamine 101 (sulforhodamine 640). This dye absorbs energy in the yellow region of the spectrum, 576 nm maximum, and emits light in the red region of the spectrum, with a maximum at 602 nm. In FIG. 3, the dashed curve illustrates the emission of an EL lamp including the two overprints as described thus far. The emission spectrum is reduced overall and redistributed to better fit the filter responses illustrated in FIG. 1. The red emission is somewhat low.

One can manipulate the spectrum by varying the amounts of dye but the problem becomes one of efficiency. The dyes absorb light and, to that extent, act like color filters. One can obtain more red by increasing the amount of red dye but the overall brightness will decrease substantially. It has been discovered that a brightness enhancing film increases the brightness of all colors but enhances operation of the red dye disproportionately. This phenomenon is believed to occur because the brightness enhancing film reflects light back to the source, where some of the light is absorbed and re-emitted as red light and some light is re-reflected. Eventually, the emitted light and the re-reflected light is emitted by the brightness enhancing film. The light reflected by the brightness enhancing film first encounters the layer of red dye and, in effect, re-uses the dye. That is, the dye producing red light receives light from two directions and has more light to convert than just the light received from the layer of dye underneath. The same is true for the "green" dye except that the light from the brightness enhancing film is filtered by the layer of red dye and is, therefore, less blue.

This theory of operation is not part of the invention but is simply a theory trying to explain the discovery. A lamp constructed in accordance with the invention produces light represented by the solid curve illustrated in FIG. 3. As can be seen, the emission curve matches the filter curves in FIG. 1 very well. In particular, the brightness of the red is more than doubled. Attempting to produce this result by adding more red dye without using a brightness enhancing film would only reduce the blue peak and the green peak and not achieve the result.

Figure 4:
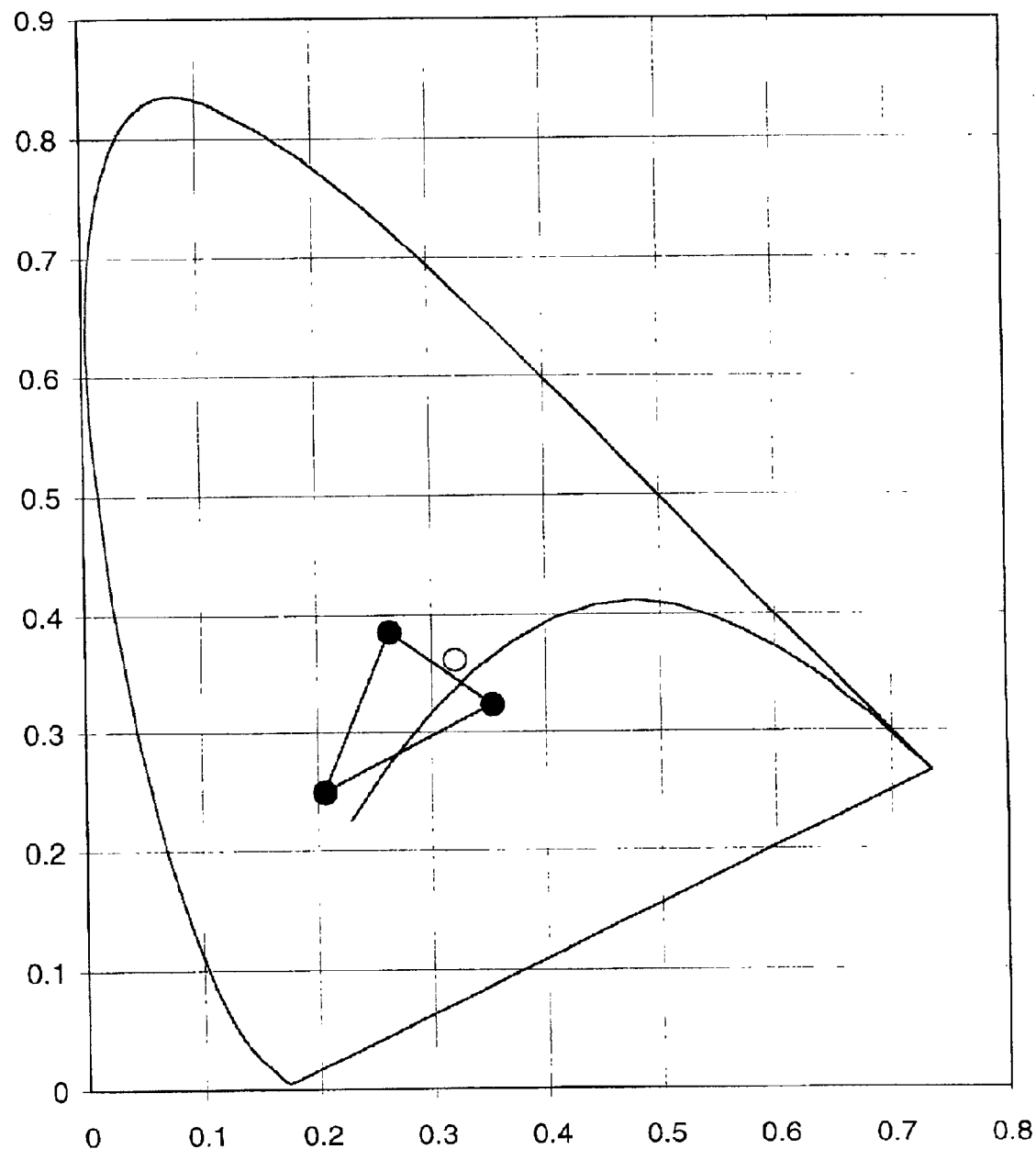
FIG. 4 is a CIE diagram including data from an EL lamp constructed in accordance with the invention back lighting a color display.

FIG. 4 is a CIE chromaticity diagram including the color coordinates of the three emission peaks from an EL lamp constructed in accordance with the invention as filtered by a display backlit by the lamp. The three peaks are interconnected by lines to form a triangle. The interior of the triangle shows the colors obtainable from the display. The open circle is the white point of the EL lamp alone. The curve adjacent the white point is the black body radiation curve. The location of the white point indicates that the lamp is bluish-white as measured but appears a neutral white to an unaided human eye.

Figure 5:
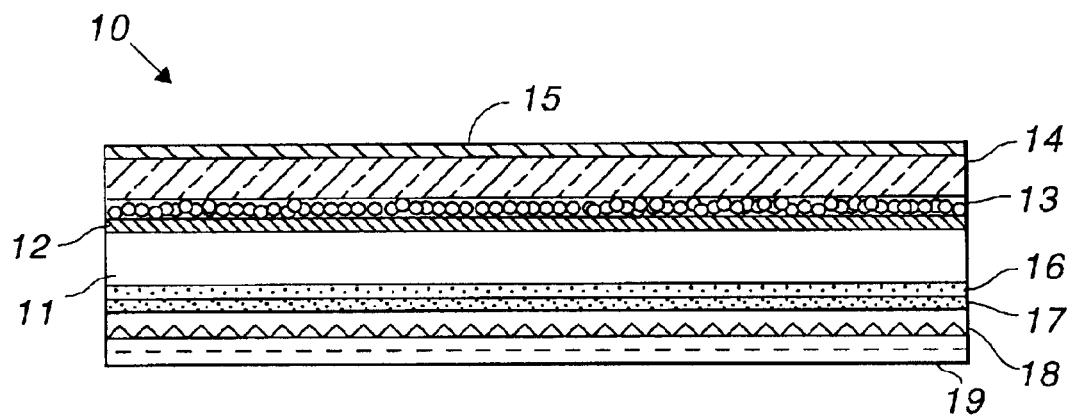
FIG. 5 is a cross-section of an electroluminescent lamp constructed in accordance with a preferred embodiment of the invention.

FIG. 5 is a cross-section of an light source constructed in accordance with a preferred embodiment of the invention using an EL lamp as the primary light source. In none of the figures are the several layers shown in proportion or to scale. EL lamp 10 includes transparent substrate 11 of polyester or polycarbonate material. Transparent electrode 12 overlies substrate 11 and includes indium tin oxide or indium oxide. Phosphor layer 13 overlies electrode 12 and dielectric layer 14 overlies the phosphor layer. Overlying dielectric layer 14 is conductive layer 15 containing conductive particles such as silver or carbon in a resin binder. Conductive layer 15 is the rear electrode and is preferably somewhat reflective. A conductive sheet, such as aluminum foil, a flex circuit, or a printed circuit board can be used instead as the rear electrode.

During operation, an alternating current is applied to electrodes 12 and 15, causing a minute current to flow between the electrodes, through the lamp, causing the phosphor in layer 13 to emit light. The light passes through green dye layer 16, where some of the blue light is converted into green light, and through red dye layer 17, where some of the green light is converted into red light. Brightness enhancing film 18 reflects some light back into layer 17, causing additional red light to be produced, as described above. Brightness enhancing film 19 is mounted cross-wise to film 18, i.e. with the grooves in the film 19 at 90° to the grooves in film 18.

Thus constructed, EL lamp 10 produces three distinct peaks at red, green and blue in the visible spectrum. An EL lamp constructed in accordance with the invention has a distinct advantage over other light sources in providing relatively uniform light over a large area. Thus, EL lamp 10 can be used to backlight many types of displays, particularly large area displays. The invention is described in conjunction with a liquid crystal display, which is but one application of the invention. The light source of the invention can be used to back light any transparent or translucent colored medium, such as photographic transparencies and signs. "Translucent" is used in the sense that one may not be able to see an image through the medium, but an image formed by the medium is clearly visible. Thus, a liquid crystal display is considered translucent and transparent is considered a sub-set of translucent.

Figure 6:
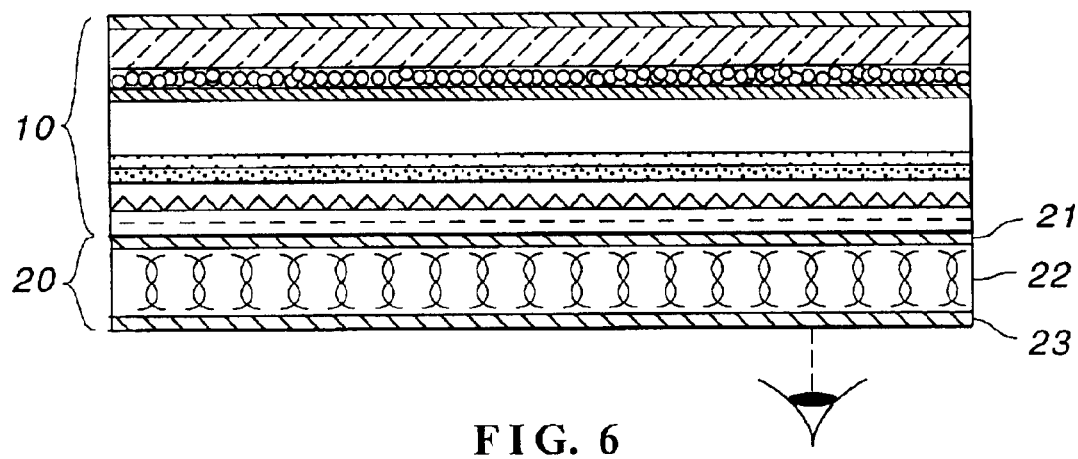
FIG. 6 is a cross-section of an electroluminescent lamp and a liquid crystal display constructed in accordance with a preferred embodiment of the invention.

FIG. 6 illustrates an EL lamp attached to a liquid crystal display for back-lighting the display. EL lamp 10 is constructed as described above. Liquid crystal display 20 includes transparent electrode 21, liquid crystal material 22, and transparent electrode 23. Other layers, e.g. polarizing layers and color filters, are not shown but are well known in the art. Liquid crystal displays operate by changing the alignment of the molecules of the material when an electric field is applied. The change in alignment either polarizes or scatters light to produce light and dark areas. For color displays, the light and dark areas are pixels aligned with suitable color filters for producing a color image. The light from EL lamp 10 matches the transmission peaks of the color filters, producing a bright, full color display.

Figure 7:
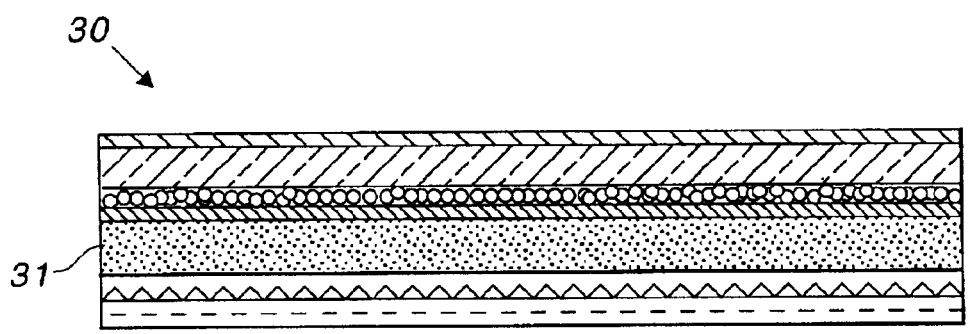
FIG. 7 is a cross-section of an EL lamp constructed in accordance with an alternative embodiment of the invention.

FIG. 7 is a cross-section of an alternative embodiment of the invention in which the dyes are in substrate 31 of EL lamp 30 instead of being separate layers. Lamp 30 operates in the same manner as EL lamp 10 to provide a full color light source.

The invention thus provides a full spectrum light source from a primary light source having a peak emission at 550 nm or less. The colors produced match the color requirements of a liquid crystal display. In one embodiment, an EL lamp includes at least one cascading dye and brightness enhancing film to produce a full color spectrum. In another embodiment, a blue or blue-green LED is the primary light source.

Having thus described the invention, it will be apparent to those of skill in the art that many modifications can be made with the scope of the invention. For example, cascading fluorescent materials can be used instead of dyes. Halftone printing can be used to provide two dyes in a single layer. Mixing two dyes in a single layer produces three peaks: blue, green, and red. Cascading layers can be attached to the back of the brightness enhancing films rather than to the primary light source. Phosphor particles can be cascading to provide the three peaks of blue, green and red.

What is claimed as the invention is:

1. An electroluminescent lamp producing a substantially white light, said lamp comprising:

a transparent substrate and a transparent front electrode overlying said substrate;

a phosphor layer overlying said front electrode, said phosphor layer producing light having a maximum emission at a wavelength shorter than 550 nm.;

a dielectric layer overlying said phosphor layer; and a conductive layer overlying said dielectric layer;

a first cascading dye in said substrate, said first cascading dye absorbing blue light and emitting green light;

a second cascading dye in said substrate, said second cascading dye absorbing light and emitting red light; and at least one layer of brightness enhancing film overlying said substrate for redirecting light at least to said second layer for enhancing emission of red light without increasing the amount of dye necessary to produce the same proportion of red light without the brightness enhancing film;

whereby said lamp produces light having substantially equal amounts of red, green and blue light.

* * * * *